United States Patent
Beard et al.

(10) Patent No.: US 8,442,437 B1
(45) Date of Patent: May 14, 2013

(54) METHOD AND APPARATUS FOR BINDING WIRELESS DEVICES

(75) Inventors: Paul Beard, Milpitas, CA (US); Ryan W Woodings, Boise, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 16 days.

(21) Appl. No.: 13/287,521

(22) Filed: Nov. 2, 2011

Related U.S. Application Data (63) Continuation of application No. 12/962,608, filed on Dec. 7, 2010, now abandoned, which is a continuation of application No. 11/027,005, filed on Dec. 30, 2004, now Pat. No. 7,848,703.

(51) Int. Cl.
*H04B 7/00* (2006.01)

(52) U.S. Cl.
USPC ......... 455/41.2; 455/41.3; 455/566; 455/420; 455/410; 455/411; 713/151; 713/168; 380/247; 380/270; 340/573.1

(58) Field of Classification Search .................. 455/41.2, 455/566, 420, 410, 411, 41.3; 713/151, 168; 380/247, 270; 340/573.1
See application file for complete search history.

(56) References Cited

U.S. PATENT DOCUMENTS

| | | | |
|---|---|---|---|
| 5,680,102 A | 10/1997 | Xydis | |
| 5,900,806 A | 5/1999 | Issa et al. | |
| 5,955,700 A | 9/1999 | Slipy et al. | |
| 6,238,338 B1 | 5/2001 | Deluca et al. | |
| 6,563,427 B2 | 5/2003 | Bero et al. | |
| 6,615,301 B1 | 9/2003 | Lee et al. | |
| 6,690,056 B1 | 2/2004 | Reedy et al. | |
| 6,708,288 B1 | 3/2004 | Ziegler et al. | |
| 6,741,178 B1 | 5/2004 | Tuttle | |
| 6,765,363 B2 | 7/2004 | Lafollette et al. | |
| 6,823,186 B2 * | 11/2004 | Salokannel et al. | 455/452.1 |
| 6,956,480 B2 | 10/2005 | Jespersen | |
| 6,961,541 B2 * | 11/2005 | Overy et al. | 455/41.2 |
| 6,970,183 B1 | 11/2005 | Monroe | |
| 7,026,983 B2 * | 4/2006 | Spratt | 342/458 |
| 7,072,615 B1 * | 7/2006 | Todd | 455/41.2 |
| 7,142,130 B2 | 11/2006 | Mukaiyama | |
| 7,142,814 B2 * | 11/2006 | Nassimi | 455/41.2 |
| 7,173,990 B2 | 2/2007 | Kim et al. | |
| 7,174,130 B2 * | 2/2007 | Kurisko et al. | 455/41.2 |
| 7,209,705 B2 * | 4/2007 | Moles et al. | 455/41.2 |
| 7,248,834 B2 | 7/2007 | Matsuo et al. | |
| 7,254,367 B2 | 8/2007 | Helden et al. | |
| 7,379,447 B2 * | 5/2008 | Dunagan et al. | 370/350 |
| 7,436,300 B2 | 10/2008 | Glass et al. | |

(Continued)

OTHER PUBLICATIONS

U.S. Appl. No. 10/859,675 "Wireless communication in a sensor," Paul Beard et al., filed Jun. 2, 2004; 24 pages.

(Continued)

*Primary Examiner* — April G Gonzales (57) ABSTRACT

One embodiment includes a method for designating, at a first device, one of a first plurality of wireless channels as a bind channel, then transmitting a channel change request message using a second plurality of wireless channels, wherein the channel change request includes which one of the plurality of wireless channels is a designated bind channel, transmitting a bind request message using the designated bind channel, and then receiving a bind response message from a second wireless device using the designated bind channel.

12 Claims, 6 Drawing Sheets

U.S. PATENT DOCUMENTS

| | | | |
|---|---|---|---|
| 7,499,985 B2 | 3/2009 | Linjama et al. | |
| 7,565,108 B2 | 7/2009 | Kotola et al. | |
| 7,848,703 B1 | 12/2010 | Beard et al. | |
| 7,869,762 B2 | 1/2011 | Lai | |
| 2001/0049740 A1 | 12/2001 | Karpoff | |
| 2003/0006737 A1 | 1/2003 | Lafollette et al. | |
| 2003/0063003 A1* | 4/2003 | Bero et al. | 340/573.1 |
| 2003/0073461 A1 | 4/2003 | Sinclair | |
| 2003/0138941 A1 | 7/2003 | Gong et al. | |
| 2003/0151600 A1 | 8/2003 | Takeuchi et al. | |
| 2003/0178395 A1 | 9/2003 | Duignan | |
| 2003/0190906 A1 | 10/2003 | Winick | |
| 2004/0107435 A1* | 6/2004 | Anzai et al. | 725/35 |
| 2004/0117435 A1 | 6/2004 | Rossmanith et al. | |
| 2004/0130446 A1 | 7/2004 | Chen et al. | |
| 2004/0139110 A1 | 7/2004 | Lamarca et al. | |
| 2004/0176032 A1* | 9/2004 | Kotola et al. | 455/41.2 |
| 2005/0048919 A1* | 3/2005 | Jeannerod | 455/41.2 |
| 2005/0064814 A1* | 3/2005 | Matsuo et al. | 455/41.1 |
| 2005/0266798 A1* | 12/2005 | Moloney et al. | 455/41.2 |
| 2005/0282588 A1* | 12/2005 | Linjama et al. | 455/566 |
| 2005/0287950 A1* | 12/2005 | Helden et al. | 455/41.2 |
| 2006/0035590 A1* | 2/2006 | Morris et al. | 455/41.2 |
| 2006/0053276 A1* | 3/2006 | Lortz et al. | 713/2 |
| 2006/0105712 A1* | 5/2006 | Glass et al. | 455/41.2 |
| 2006/0149963 A1* | 7/2006 | Lu et al. | 713/151 |
| 2006/0183462 A1* | 8/2006 | Kolehmainen | 455/411 |
| 2006/0199536 A1 | 9/2006 | Eisenbach | |
| 2006/0199836 A1 | 9/2006 | Turtle et al. | |
| 2006/0234630 A1* | 10/2006 | Lai | 455/41.2 |
| 2007/0093207 A1* | 4/2007 | Kim | 455/41.2 |

OTHER PUBLICATIONS

U.S. Appl. No. 11/027,005: "Method and Apparatus for Binding Wireless Devices," Beard et al.; 24 pages.

U.S. Appl. No. 12/239,602 "Wireless Communication Device and Method," Paul Beard et al., filed Sep. 26, 2008; 33 pages.

U.S. Appl. No. 12/962,608: "Method and Apparatus for Binding Wireless Devices," Beard et al., filed Dec. 7, 2010; 24 pages.

U.S. Appl. No. 13/287,521: "Method and Apparatus for Binding Wireless Devices," Beard, et al., filed Nov. 2, 2011; 29 pages.

U.S. Appl. No. 60/476,530 "Wireless communication in a sensor," Paul Beard et al., filed Jun. 4, 2003; 10 pages.

ECMA International, "Near Field Communication White Paper"; ECMA/TC32TG19/2004/1; 9 pages.

Ryan Woodings et al., "Rapid Heterogeneous Connection Establishment: Accelerating Bluetooth Inquiry Using IrDA"; 14 pages.

USPTO Advisory Action for U.S. Appl. No. 10/859,675 dated Jan. 12, 2007; 3 pages.

USPTO Final Rejection for U.S. Appl. No. 10/859,675 dated May 26, 2009; 7 pages.

USPTO Final Rejection for U.S. Appl. No. 10/859,675 dated Nov. 2, 2006; 8 pages.

USPTO Final Rejection for U.S. Appl. No. 11/027,005 dated Nov. 1, 2007; 20 pages.

USPTO Final Rejection for U.S. Appl. No. 11/027,005 dated Nov. 5, 2008; 14 pages.

USPTO Final Rejection for U.S. Appl. No. 13/287,521 dated Jul. 13, 2012; 15 pages.

USPTO Non-Final Rejection for U.S. Appl. No. 10/859,675 dated Nov. 19, 2007; 7 pages.

USPTO Non-Final Rejection for U.S. Appl. No. 10/859,675 dated Jul. 12, 2006; 8 pages.

USPTO Non-Final Rejection for U.S. Appl. No. 11/027,005 dated Feb. 16, 2010; 10 pages.

USPTO Non-Final Rejection for U.S. Appl. No. 11/027,005 dated May 14, 2007; 12 pages.

USPTO Non-Final Rejection for U.S. Appl. No. 11/027,005 dated May 15, 2008; 13 pages.

USPTO Non-Final Rejection for U.S. Appl. No. 12/239,602 dated Jun. 8, 2011; 8 pages.

USPTO Non-Final Rejection for U.S. Appl. No. 12/962,608 dated Apr. 1, 2011; 23 pages.

USPTO Non-Final Rejection for U.S. Appl. No. 13/287,521 dated Dec. 7, 2011; 14 pages.

USPTO Notice of Allowance for U.S. Appl. No. 11/027,005 dated Jan. 28, 2009; 14 pages.

USPTO Notice of Allowance for U.S. Appl. No. 11/027,005 dated May 13, 2009; 13 pages.

USPTO Notice of Allowance for U.S. Appl. No. 11/027,005 dated Jul. 27, 2010; 11 pages.

USPTO Notice of Allowance for U.S. Appl. No. 11/027,005 dated Oct. 28, 2009; 13 pages.

USPTO Notice of Allowance for U.S. Appl. No. 12/239,602 dated Jan. 25, 2012; 5 pages.

USPTO Notice of Allowance for U.S. Appl. No. 12/239,602 dated Dec. 27, 2011; 7 pages.

USPTO Requirement for Restriction for U.S. Appl. No. 10/859,675 dated Apr. 19, 2007; 6 pages.

USPTO Requirement for Restriction for U.S. Appl. No. 10/859,675 dated Sep. 6, 2007; 3 pages.

* cited by examiner

FIG.1

BINDING MODE
FIG.2

METHOD AND APPARATUS FOR BINDING WIRELESS DEVICES

RELATED APPLICATIONS

This application is a continuation of U.S. patent application Ser. No. 12/962,608, filed Dec. 7, 2010, which is a continuation of U.S. patent application Ser. No. 11/027,005, filed Dec. 30, 2004, now U.S. Pat. No. 7,848,703 issued Dec. 7, 2010, the entire contents of each are incorporated by reference herein.

BACKGROUND

Wired peripherals, such as keyboards, mice, game controllers, etc. are physically connected to a host computer by a cable. Wireless peripherals on the other hand are not physically connected to the host computer. Therefore wireless peripherals must be paired to the host to create a "virtual cable." During the "pairing" or "binding" process, two wireless devices exchange device identifiers (IDs) and agree upon one of multiple wireless channels for transmitting information. The device IDs are sent along with the wireless transmissions so that the receiving device can confirm it is receiving data from the correct remote wireless device.

Today there are three main techniques for wirelessly pairing a peripheral with a desired host. The first technique requires a user to push buttons on the peripheral and host at the same time. This places both devices in a special pairing mode where the two devices exchange pairing information. The pairing button technique assumes that no other devices will be in the pairing mode at the same time. This is the typical technique used with most 27 Mega Hertz (MHz) wireless mice and keyboards.

The pairing buttons used for the pairing button technique add cost to the host and peripheral devices. The pairing buttons are usually placed in out of the way locations on the wireless devices and are relatively small so they are not accidentally pressed during normal wireless operations. Users are frustrated when they cannot find or activate these small out of the way pairing buttons.

A second pairing technique requires the wireless peripheral device to query all devices in range and present a list to the user. The peripheral user then selects the desired host from the displayed list. The list technique requires a user interface, which is not available on many low-cost peripheral devices. This technique also requires the user to know the name, or some other distinguishing characteristic, of the desired host in order to select it from the list of all in-range devices.

A third wireless system adds a near field communications transceiver to each wireless device that only transmits over a few centimeters. This technique requires additional transceiver hardware and additional firmware to control the special near field communications transceiver. The near field transceiver uses special wireless binding signals that are different from the signaling used for normal data communications. This adds additional wireless hardware to the system that is cost-prohibitive for many low-cost peripherals.

The present invention addresses this and other problems associated with the prior art.

SUMMARY OF THE INVENTION

When wireless binding or pairing is required, two wireless devices change from a normal broad wireless operating range to a reduced wireless operating range. The wireless devices then conduct binding or pairing operations in the reduced wireless range. This prevents other wireless devices in the same area from detecting the same reduced range binding signaling and inadvertently binding with the wrong devices. After the reduced range binding operations are completed, the wireless devices automatically switch back to the broader normal wireless operating range and use the exchanged binding information for conducting normal wireless communications. The reduced range pairing scheme creates a simple and intuitive technique for pairing wireless devices without requiring the user to press buttons or select devices from a list.

The foregoing and other objects, features and advantages of the invention will become more readily apparent from the following detailed description of a preferred embodiment of the invention which proceeds with reference to the accompanying drawings.

DETAILED DESCRIPTION

Figure 1:
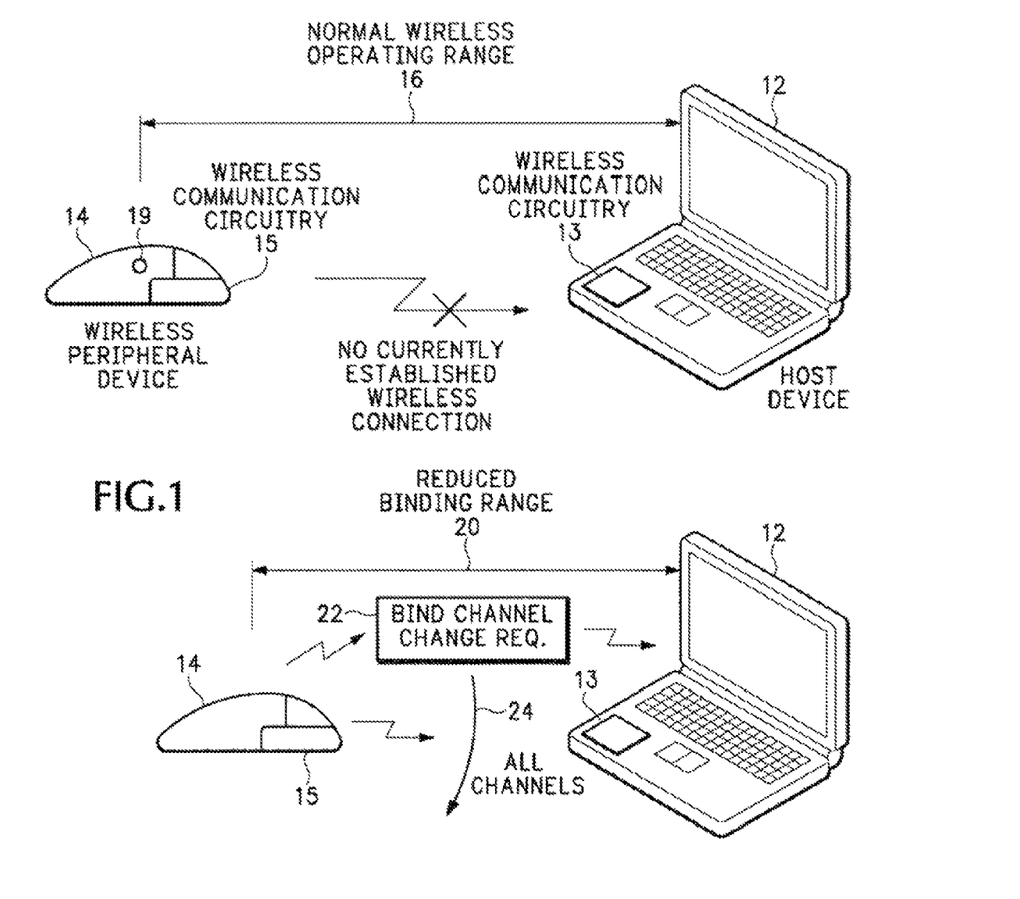
FIG. 1 is a diagram showing two wireless devices switching from a normal wireless operating range to a reduced binding range.

FIG. 1 shows a host device 12 that in this example is a Personal Computer (PC) and a peripheral device 14 that in this example is a computer mouse. These of course are just examples and the host device 12 and the peripheral device 14 can be any devices that need to wirelessly communicate with each other. For example, the wireless peripheral device 14 can be a game console, toy, keyboard, wireless sensors, etc. that needs to communicate with a computer, television, stereo, server, or other type of host computing device 12.

The peripheral device 14 includes wireless communication circuitry 15 that is used to wirelessly communicate with wireless communication circuitry 13 in host device 12. The wireless communication circuitry 13 and 15 is described in more detail below in FIG. 6 but can be any type of wireless communication circuitry, such as the type used for Bluetooth, IEEE 802.11, or for any other type of wireless communications.

The peripheral device 14 and the host device 12 conduct normal data and message communications over what is referred to as a normal wireless operating range 16. The normal wireless operating range 16 refers to the range of distances that the host device 12 and peripheral device 14 are normally spaced apart when conducting wireless communications. The normal wireless operating range 16 also refers to the wireless signal amplification levels or power levels normally used in the wireless devices 12 and 14 when conducting normal data and message communications.

When the peripheral device 14 is not currently wirelessly connected to the host device 12, or has never been wirelessly connected to the host device 12, the peripheral device 14 automatically reduces its normal operating range 16 to a reduced binding mode range 20. In other embodiments, the peripheral device 14 may switch to the reduced binding mode range 20 whenever it first powers up or whenever it does not currently know the wireless identification number of host device 12. Alternatively, the peripheral device 14 may switch to the reduced binding range 20 when a button 19 is pressed by a user.

The reduced binding range 20 refers to a reduced narrower range of distances that the peripheral device 14 must be physically located next to the host device 12 in order to conduct wireless communications. In one example, the peripheral device 14 switches to the reduced binding range 20 by reducing the amplification level of signals transmitted from the wireless communication circuitry 15.

While in the reduced binding range 20, the peripheral device 14 sends a bind channel change request message 22 on all channels 24 requesting any in-range host device to enter a pairing or binding mode. All channels 24 include any channels that host device 12 may be currently operating on. Because the peripheral device 14 is transmitting at a low power level, the bind channel change request 22 can only be successfully processed by a host device 12 that is in relatively close proximity to peripheral device 14. Thus, a binding handshake exchange can be initiated simply by a user moving the peripheral device 14 close to the desired host device 12.

In one example, the reduced binding range 20 may be somewhere around 6-12 inches or in other words around 15-30 centimeters. Reducing the communication range 20 to inches, reduces the possibility that the peripheral device 14 may unintentionally pair with the wrong host device.

In one example, the host device 12 successfully receiving the bind channel change request message 22 may also reduce the transmit power level and/or receive sensitivity of communication circuitry 13. This is done in one embodiment by reducing the amplification level of the transmit and/or receive signals in the wireless communication circuitry 13.

The host device 12 and the peripheral device 14 then each enter a pairing or binding mode where each configure their wireless communication circuitry 13 and 15, respectively, to operate on a particular bind channel. In one example, this may be a predetermined channel only used for binding operations. For example, in current spread spectrum wireless systems, this could be channel 78 while channels 0-77 are used for normal communications. Of course any predefined channel can be used. In an alternative embodiment, the bind channel change request 22 can identify the bind channel that the two devices 12 and 14 should use for conducting binding operations.

The bind channel change request 22 notifies the host device 12 to change to the bind mode. In addition to operating at a reduced binding range 20, wirelessly sending the bind channel change request 22 is also new. In previous binding systems, a binding button had to be pressed in order to initiate binding operations in the host computer.

Figure 2:
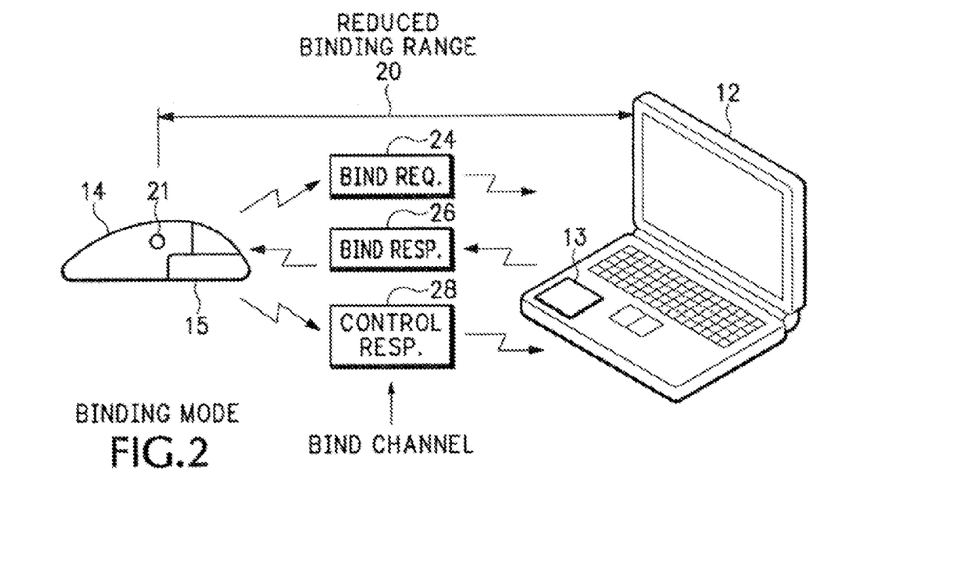
FIG. 2 is a diagram showing the wireless devices conducting binding operations while operating in the reduced binding range.

FIG. 2 shows the operations that are performed by the peripheral device 14 and the host device 12 while in the binding mode and while operating in the reduced binding range 20. In the binding mode, the peripheral device 14 and host device 12 send conventional binding messages 24, 26, and 28, but at a greatly reduced range that can only be successfully received by another wireless device in relatively close proximity.

Bind request 24 causes the host device 12 to send back a bind response 26 that identifies a wireless channel for conducting normal wireless communications. The response 26 also includes an identifier that is used by the peripheral device 14 to identify wireless communications from host device 12. The peripheral device 14 then sends a final control response 28 back to the host device 12 that acknowledges the previous bind response 26 and causes both the peripheral device 14 and the host device 12 to revert back to a normal operating mode. A Light Emitting Diode (LED) 21 may then be activated on the peripheral or host device 14 to notify the user that the binding operations were successfully completed.

Figure 3:
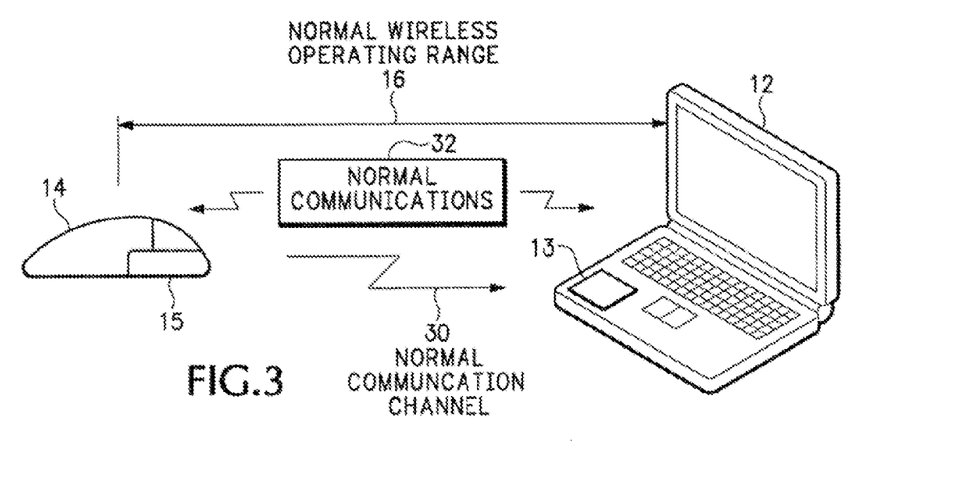
FIG. 3 is a diagram showing the two wireless devices switching back to the normal operating range.

FIG. 3 shows the peripheral device 14 and host device 12 after they have switched back to the normal wireless operating range 16. The peripheral device 14 and the host device 12 each switch their communication circuitry 15 and 13 to operate on the channel 30 identified during the binding session in FIG. 2. The communication circuitry 13 and 15 increase their transmit and receive signal strengths back to normal operational power levels. This allows wireless communications 32 at the normal wireless operating range 16.

Figure 4:
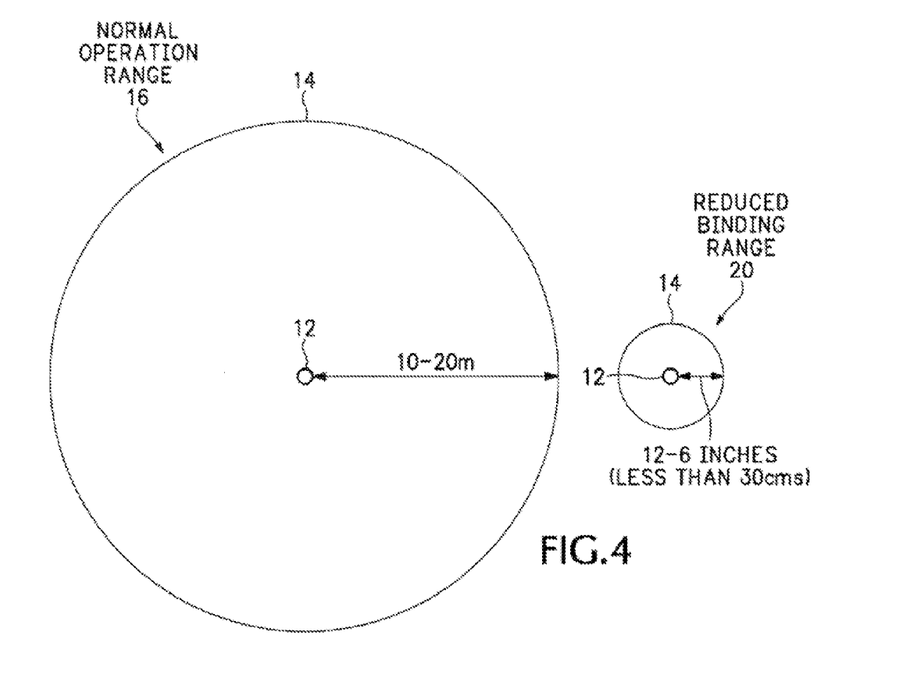
FIG. 4 shows a diagram comparing one example of the normal operating range with the reduced binding range.

FIG. 4 shows a diagram of the normal operating range 16 that is used for normal communications between the peripheral 14 and the host device 12. In one example, when both the peripheral device 14 and the host device 12 operate at normal transmit and receive signal strengths, the normal wireless operating range 16 is around 10-20 meters. In one example, when the transmit or receive signal strengths are reduced in the peripheral device 14 and the host device 12, the reduced binding range 20 is somewhere around, or less than, 6-12 inches or equivalently around, or less than, 15-30 centimeters (cms). These are only examples of the different operating ranges 16 and 20. The normal transmit or received signal strengths and the corresponding amount of signal strength reduction can be varied according to the desired operating parameters of the wireless system.

There is less likelihood that other wireless devices will mistakenly respond to the binding messages when the wireless devices operate in the reduced binding range 20. This allows a user to pair two wireless devices simply by moving the two devices close together. This is a more intuitive method for pairing a peripheral device with a host device, is more user-friendly, and results in lower cost.

Figure 5:
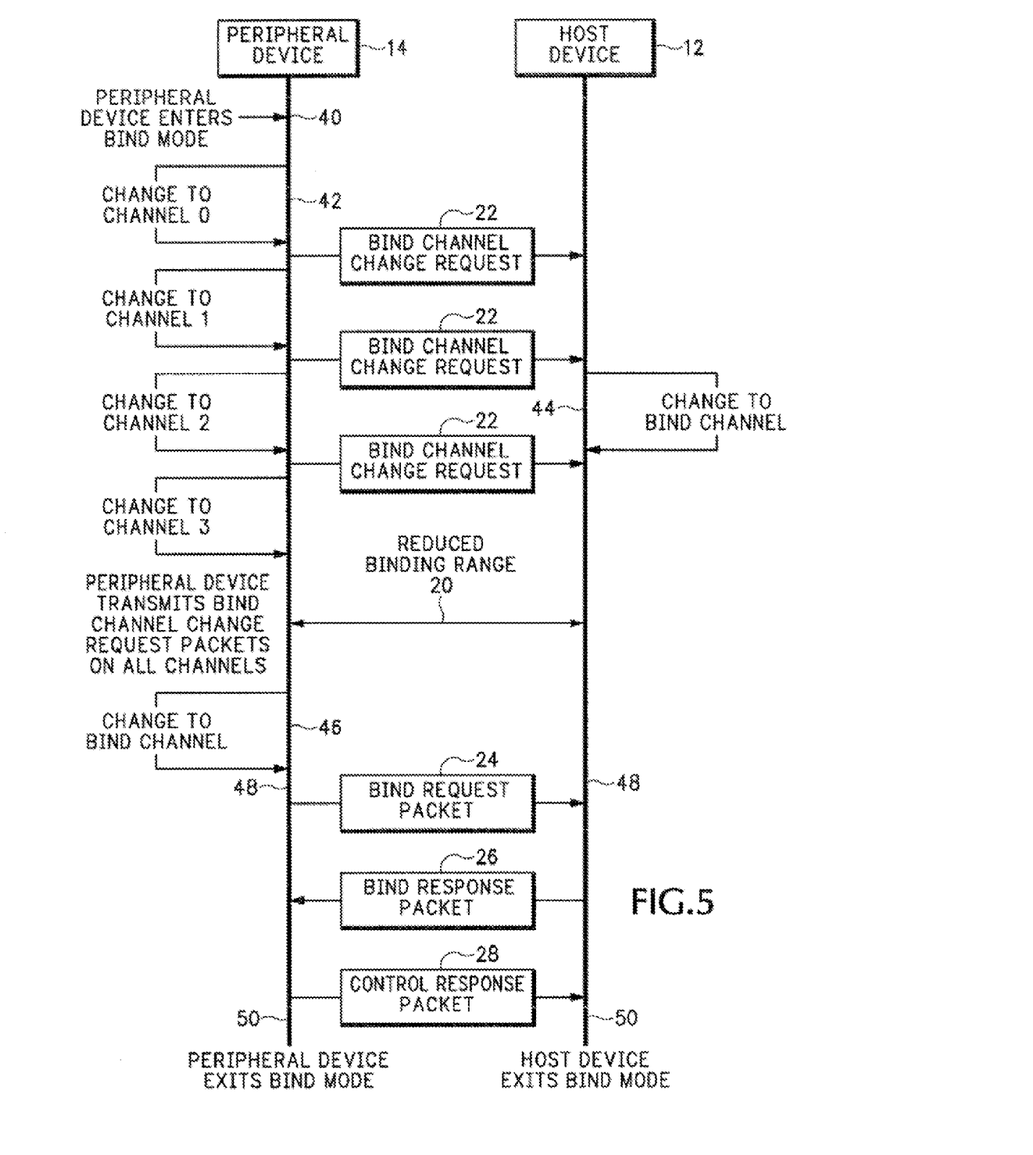
FIG. 5 is a sequence diagram showing the operations performed by the wireless devices.

FIG. 5 is a sequence diagram describing in further detail the operations performed by the peripheral device 14 and the host device 12 while in the reduced binding range 20. At stage 40 the peripheral device 14 enters the bind mode. As explained above, at initial power up, the peripheral device may not have a host device ID or operating channel configured for sending wireless communications. Alternatively, a current wireless configuration may no longer be operational. For example, the peripheral device 14 may not receive some number of responses back from the host device 12 over the currently configured communication channel. If any of these events happen, the peripheral device reduces its communications range as shown in FIGS. 1 and 2.

At stage 42, the peripheral device 14 sends out the bind channel change request packet 22 on each channel that the host device 12 might possibly be operating on. At stage 44, the host device 12 receives the bind channel change request packet 22 on one of the channels and accordingly changes its wireless communication circuitry 13 (FIG. 1) to start transmitting and receiving messages on the bind channel. At stage 46, the peripheral device 14 has completed sending the bind channel change request packet 22 on each channel. The peripheral device 14 then configures its local wireless communication circuitry 15 to start transmitting and receiving messages on the bind channel.

At stage 48, the peripheral device 14 and the host device 12 exchange conventional bind mode messages as previously described in FIG. 2. The bind request packet 24 solicits a bind response 26 from host device 12. However, in a novel operation, the host device 12 checks the received signal strength associated with bind request packet 24. The host 12 may successfully receive the bind request packet 24. However, the host might not respond if the bind request packet 24 has a received signal strength below some predefined threshold. This prevents two host devices that are in close proximity from trying to bind to the same peripheral device.

If a received signal strength indication (RSSI) level is above the predefined threshold, the host device 12 sends the bind response packet 26 back to the peripheral device 14. The bind response packet 26 identifies to the peripheral device 14 the channel that is going to be to used for normal communications and also provides a host device identifier value. The peripheral device 14 then provides an acknowledge and any other necessary control information back to the host device 12 in control response packet 28. At stage 50 the peripheral device 14 and host device 12 both exit the bind mode and start operating on the identified channel at the normal operating range 16 as previously shown in FIG. 3. The peripheral device 14 may also activate the LED 21 (FIG. 1).

Figure 6:
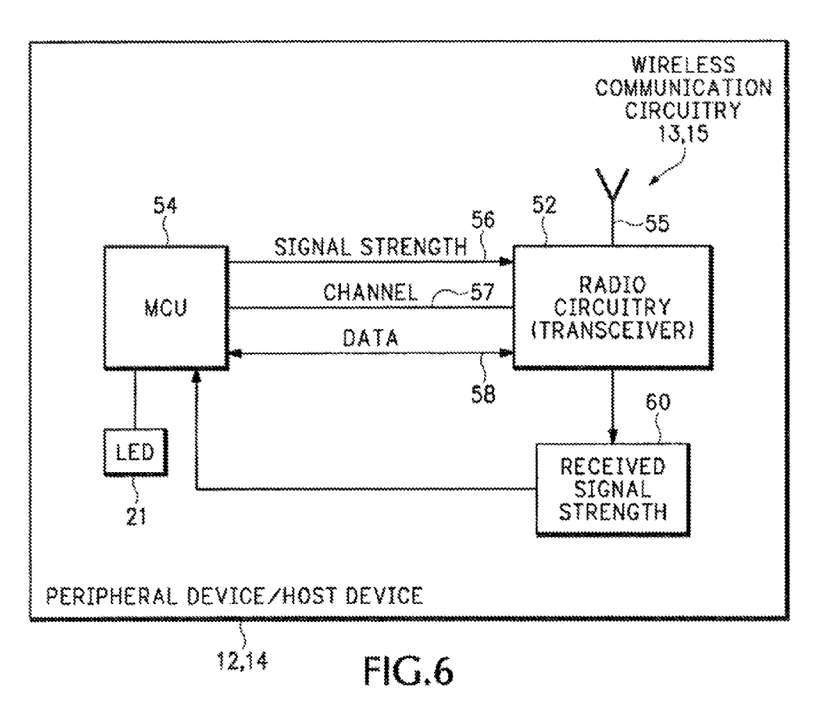
FIG. 6 is a detailed block diagram of the wireless communication circuitry inside the wireless devices.

FIG. 6 shows in more detail the wireless communication circuitry 13 or 15 operating in the host device 12 or peripheral device 14, respectively. The host device 12 and peripheral device 14 each include a micro-processor unit (MCU) 54 that controls the operation of radio circuitry 52. The radio circuitry 52 can be any conventional transceiver that transmits and receives wireless signals. The MCU 54 sends data 58 to the radio circuitry 52 that is then encoded into wireless signals and transmitted over one of the available wireless channels. Similarly, any signals received over the wireless channel by the radio circuitry 52 is decoded into digital data that is then sent to the MCU 54 for additional processing.

The MCU 54 outputs a signal strength control signal 56 that is used by the radio circuitry 52 to adjust the amplification of the transmitted and/or received wireless signals. For example, a lower value is sent on signal strength signal 56 when the MCU 54 wants the radio circuitry 52 to operate in the reduced binding range 20. Radio circuitry 52 then varies the amplification of transmit or receive signals according to signal 56. Radio circuitry 52 is known to those skilled in the art and is therefore not described in further detail.

A receive signal strength monitor 60 can be used by the host device 12 to identify a received signal strength during the binding mode operations. As described above, if the received signal strength of the bind channel change request packet 22 or the bind request to packet 24 (FIG. 5) is below a predetermined threshold level, the host device 12 may ignore the received packet. This further prevents binding between the wrong wireless devices.

In one example, the radio circuitry 52 transmits wireless signals using a Bluetooth, 802.11, or some other spread spectrum transmission protocol. However it should be understood that the reduce binding range can be used with any wireless system that needs to perform binding operations.

The MCU 54 is configured to operate the same radio circuitry 52 in both the normal communications range 16 and in the reduced binding range 20. As described above, the MCU 54 automatically operates the radio circuitry 52 in the reduced binding range 20 when the radio circuitry needs to be paired with a remote wireless device and operates the radio circuitry 52 in the normal communications range when the radio circuit is successfully paired with the remote wireless device 14.

The MCU 54 changes between the different channels by varying the channel signal value 57 and controls the sending of the bind channel change request packets 22 on each of the plurality of different wireless channels. The MCU 54 also switches the radio circuitry 52 to start operating on the bind channel by setting an associated channel value 57 and performs the other operations described in FIG. 5. After binding operations have been successfully completed, the MCU 54 may activate LED 21 for some period of time.

The reduced range pairing operation does not require any additional radio circuitry or other hardware. For example, no additional buttons or near-field communications transceivers are required. A user does not have to fumble with small obscurely-placed buttons or confusing lists of hosts. Reduced range pairing is simple for a user to understand and also reduces the possibility of the peripheral pairing with the wrong host, which is more of a possibility with the button and list techniques.

Other ways to reduce the effective communication range between the peripheral device 14 and the host device 12, include bypassing the antenna 55. Additional hardware could also be used to trigger the devices 12 and 14 to enter the pairing mode. For example, a magnetic reed switch could be used as a trigger to indicate when the peripheral device 14 is held close enough to the host device 12 for conducing the bind operations. The host device 12 could include a large magnet that activates the magnetic reed switch when the two devices are within binding range.

Figure 7:
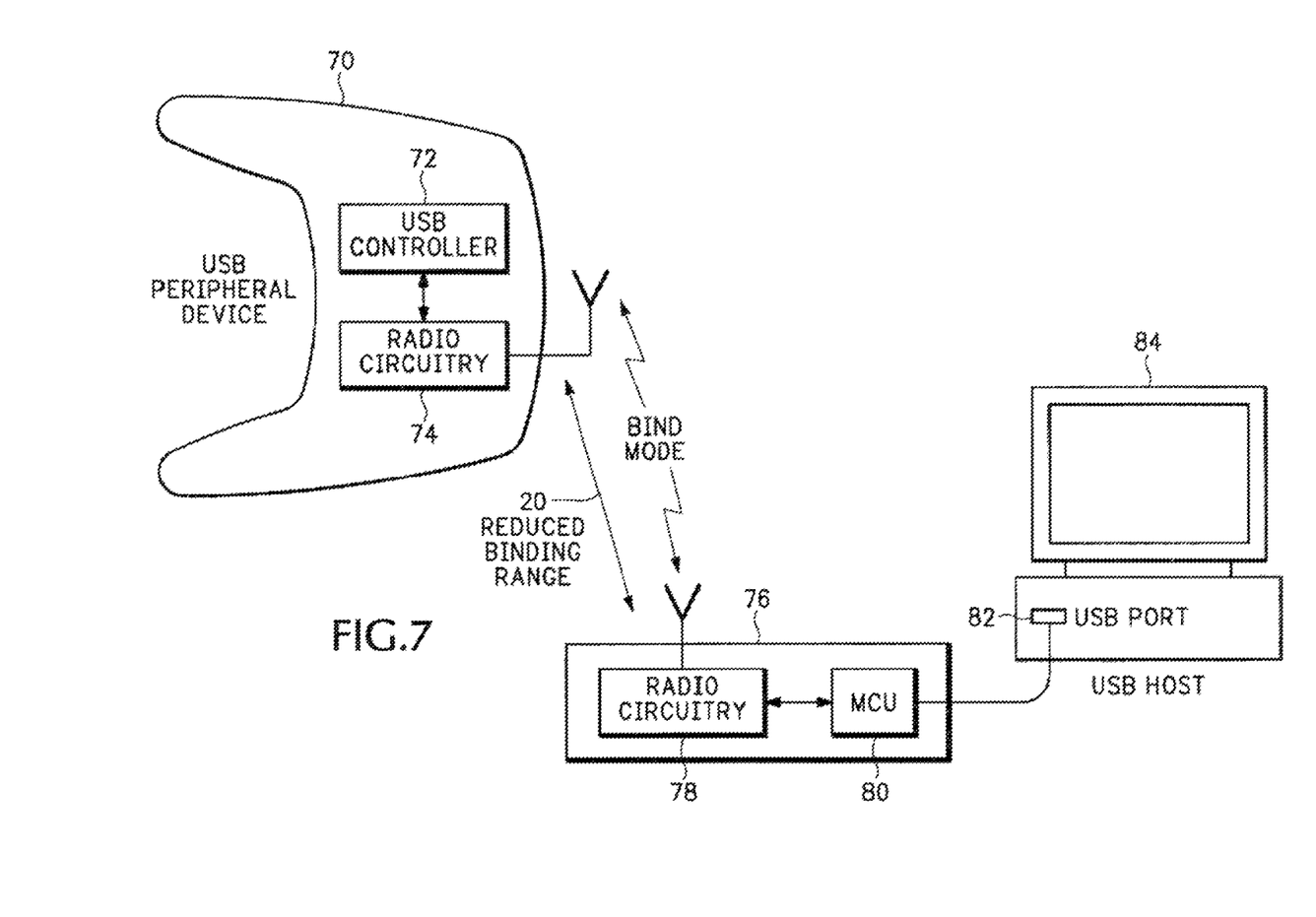
FIG. 7 is a diagram of a wireless Universal Serial Bus (USB) device that uses the reduced binding range to bind with a USB host.

FIG. 7 shows another embodiment where the reduced binding range 20 is used when a Universal Serial Bus (USB) device 70 needs to bind to a USB host 84. In this example, the USB device 70 is a wireless game controller. The game controller includes a USB controller 72 for sending or receiving USB messages. A radio circuit 74 converts the USB messages into radio signals that are transmitted to a wireless dongle 76. The dongle 76 includes radio circuitry 78 that is controlled by a MCU 80. The MCU connects to a USB port 82 on a host computer 84. The radio circuitry 74 and 78 and the processors 72 and 80 operate in a manner similar to the radio circuitry 52 and MCU 54 in FIG. 6.

The commands generated by the game controller 70 are converted by the USB controller 72 into USB messages that are transmitted via radio circuitry 74 and 78 to the MCU 80. The MCU 80 then sends the USB messages over USB port 82 to the USB host computer 84. During a binding operation, a user simply places the game controller 70 within some minimum distance from dongle 76. The two controllers 72 and 80 then automatically reduce their operating range and conduct the binding operations described above. The user can then move the game controller 70 back to some conventional wireless operating distance and start performing normal wireless game controller operations.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A method comprising:
   at a first wireless device, designating one of a first plurality of wireless channels as a bind channel;
   automatically and without human intervention switching from a normal transmission strength of the first wireless device to a reduced transmission strength of the first wireless device;
   transmitting by the first wireless device, at the reduced transmission strength, a channel change request message using a second plurality of wireless channels, wherein the channel change request includes which one of the plurality of wireless channels is a designated bind channel;
   transmitting by the first wireless device, at the reduced transmission strength, a bind request message using the designated bind channel; and
   receiving a bind response message from a second wireless device using the designated bind channel.

2. The method of claim 1, wherein the reduced transmission strength reduces a range of an RF link between the first and second wireless devices when communicating during a bind operation.

3. The method of claim 1, further comprising configuring the first wireless device to exchange data with the second wireless device in response to the receiving of the bind response message.

4. The method of claim 2, wherein the configuring of the first wireless device includes increasing the range of the RF link.

5. The method of claim 3, wherein the configuring of the first wireless device includes changing to a new channel for normal communication, wherein new channel information is included in the bind response message received from the second wireless device.

6. A method comprising:
   responsive to a first wireless device automatically and without human intervention switching from a normal transmission strength of the first wireless device to a reduced transmission strength of the first wireless device,
   receiving by a second wireless device a channel change request message transmitted by the first wireless device, at the reduced transmission strength, on one of a plurality of wireless channels, the channel change request including data indicating which one of the plurality of wireless channels is a designated bind channel;
   configuring the second wireless device to receive messages on the designated bind channel;
   receiving by the second wireless device a bind request message, transmitted by the first wireless device at the reduced transmission strength, on the bind channel; and
   transmitting by the second wireless device a bind response message on the bind channel.

7. The method of claim 6, wherein the reduced transmission strength reduces a range of an RF link between the first and the second wireless devices when communicating using the bind channel.

8. The method of claim 6, further comprising:
   selecting a channel for normal communication to include in the bind response message; and
   configuring the second wireless device to communicate messages with the first wireless device on the selected channel for normal communication after the transmission of the bind response message.

9. The method of claim 8, wherein the configuring of the second wireless device includes increasing a range of an RF link.

10. A method comprising:
    at a first wireless device, automatically and without human intervention switching from a normal transmission strength of the first wireless device to a reduced transmission strength of the first wireless device;
    designating one of a plurality of wireless communications channels as a bind channel;
    transmitting by the first wireless device, at the reduced transmission strength, a channel change request message on each of the plurality of wireless communications channels, wherein the channel change request includes which one of the plurality of wireless channels is a designated bind channel;
    receiving by a second wireless device the channel change request message;
    configuring the first wireless device to transmit messages on the designated bind channel;
    configuring the second wireless device to receive messages on the designated bind channel;
    transmitting by the first wireless device a bind request message, at the reduced transmission strength;
    receiving by the second wireless device the bind request message;
    transmitting by the second wireless device a bind response message; and
    receiving by the first wireless device the bind response message.

11. The method of claim 10, wherein the reduced transmission strength reduces a range of an RF link between the first and the second wireless devices when communicating using the bind channel.

12. The method of claim 10, further comprising:
    selecting at the second wireless device a channel for normal communication to include in the bind response message; and
    configuring the second wireless device to communicate messages with the first wireless device on the selected channel for normal communication after the transmission of the bind response message.

* * * * *